3,845,054
SUBSTITUTED PYRIDAZONES

Franz Reicheneder, Ludwigshafen, Rudolf Kropp, Limburgerhof, and Adolf Fischer, Mutterstadt, Germany, assignors to Badische Anilin- & Soda-Fabrik Aktiengesellschaft, Ludwigshafen (Rhine), Germany
No Drawing. Filed Mar. 27, 1972, Ser. No. 238,526
Claims priority, application Germany, Apr. 10, 1971,
P 21 17 681.8
Int. Cl. C07d 51/04
U.S. Cl. 260—250 A    4 Claims

ABSTRACT OF THE DISCLOSURE

New and valuable substituted pyridazone derivatives having good herbicidal properties and a process for controlling the growth of unwanted plants with these compounds.

---

The present invention relates to new and valuable substituted pyridazones and herbicides containing them.

It is known to use 1-phenyl-4-amino - 5 - bromopyridazone-(6) as a herbicide. However, its action is not satisfactory.

We have now found that substituted pyridazones of the formula

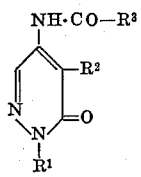

where $R^1$ denotes phenyl or cyclohexyl, $R^2$ denotes bromine and $R^3$ denotes —CHCl$_2$, —CH$_2$Br or —H, are valuable herbicidally active compounds.

The compounds have a strong herbicidal action on broadleaved and grassy weeds, particularly on *Alopecurus myosuroides, Poa annua, Poa trivialis, Bromus tectorum*, and *Echinochloa crus-galli*. The active ingredients may be successfully used in agriculture, especially in the following crops: Triticum spp., Hordeum spp., Beta spp., *Zea mays, Soja hispida, Gossypium hirsutum* and *Saccharum officinarum*. Application rates are approx. 1 to 6 kg. per hectare.

The compounds may for instance be prepared by reacting a 4-aminopyridazone derivative with a carboxylic acid or an acyl chloride.

The preparation of the compounds of the invention is illustrated below.

EXAMPLE 1

26.5 parts (by weight) of 1-phenyl-4-amino-5-bromopyridazone-(6) is placed in a mixture consisting of 46 parts of formic acid and 98 parts of acetic anhydride and the whole is kept at 100° C. for 2 hours while stirring. After cooling, 25 parts of 1-phenyl - 4 - formylamino-5-bromopyridazone-(6) (I) is precipitated. Melting point: 229° to 231° C. (recrystallized from acetonitrile).

Examples of other compounds of the invention are as follows:

1-phenyl-4-dichloroacetylamino-5-bromopyridazone - (6) (II), m.p.: 152°–153° C.;
1-phenyl-4-bromoacetylamino - 5 - bromopyridazone-(6) (III), m.p.: 146°–149° C.

The compounds according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

To improve the action oils may be added or the active ingredients used direct as oil dispersions.

Dusts may be prepared by mixing or grinding the active ingredients with a solid carrier, e.g. kieselguhr, talc, clay or fertilizers.

The following examples demonstrate the use of the new active ingredients.

EXAMPLE 2

In a greenhouse, loamy sandy soil was filled into pots and sown with *Triticum aestivum, Beta vulgaris, Zea mays, Sinapis arvensis, Stellaria media, Poa annua, Poa trivialis* and *Echinochloa crus-galli*. The soil prepared in this manner was then treated with 2 kg. per hectare of each of I, II and III and, for comparison, with 2 kg. per hectare of 1-phenyl-4-amino - 5 - chloropyridazone-(6) (IV), each active ingredient being dispersed in 500 liters of water per hectare.

After 4 to 5 weeks I, II and III showed the same good crop plant compatibility as IV, combined with a superior herbicidal action. The results of the experiment are given in the following Table:

| Active ingredient | I | II | III | IV |
|---|---|---|---|---|
| Triticum aestivum | 10 | 15 | 10 | 20 |
| Beta vulgaris | 0 | 0 | 0 | 0 |
| Zea mays | 0 | 0 | 0 | 10 |
| Sinapis arvensis | 100 | 100 | 95 | 70 |
| Stellaria media | 95 | 95 | 95 | 70 |
| Poa annua | 90 | 95 | 95 | 70 |
| Poa trivialis | 85 | 90 | 90 | 65 |
| Echinochloa crus-galli | 85 | 90 | 90 | 60 |

NOTE: 0=no damage; 100=complete destruction.

EXAMPLE 3

On an agricultural plot the plants *Zea mays, Beta vulgaris, Triticum aestivum, Sinapis arvensis, Chenopodium album, Poa annua, Bromus tectorum* and *Echinochloa crus-galli* were treated at a growth height of from 3 to 15 cm. with 2 kg. per hectare of each of I, II, III and IV, each compound being dispersed or emulsified in 500 liters of water per hectare.

After 3 to 4 weeks it was ascertained that I, II and III had a stronger herbicidal action than IV, combined with the same good crop plant compatibility.

The results of the experiment are given below:

| Active ingredient | I | II | III | IV |
|---|---|---|---|---|
| Zea mays | 0 | 0 | 0 | 10 |
| Beta vulgaris | 5 | 5 | 0 | 0 |
| Triticum aestivum | 5 | 10 | 5 | 20 |
| Sinapis arvensis | 100 | 100 | 95 | 80 |
| Chenopodium album | 100 | 100 | 95 | 80 |
| Poa annua | 100 | 95 | 95 | 50 |
| Bromus tectorum | 95 | 90 | 90 | 40 |
| Echinochloa crus-galli | 90 | 90 | 85 | 40 |

NOTE: 0=no damage; 100=complete destruction.

EXAMPLE 4

80 parts by weight of compound I is mixed with 20 parts by weight of N-methyl-α-pyrrolidone. A mixture is obtained which is suitable for application in the form of very fine drops.

EXAMPLE 5

20 parts by weight of compound II is dissolved in a mixture consisting of 80 parts by weight of xylene, 100 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of compound III is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of compound II is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of compound I is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 9

3 parts by weight of compound III is intimately mixed with 97 parts by weight of particulate kaolin. A dust is obtained containing 3% by weight of the active ingredient.

EXAMPLE 10

30 parts by weight of compound I is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. A substituted pyridazone of the formula

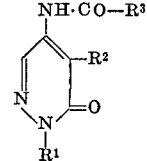

where $R^1$ denotes phenyl or cyclohexyl, $R^2$ denotes bromine, and $R^3$ denotes —$CHCl_2$, —$CH_2Br$ or —H.

2. 1-phenyl-4-formylamino-5-bromopyridazone-(6).
3. 1-phenyl - 4 - dichloroacetylamino - 5 - bromopyridazone-(6).
4. 1 - phenyl - 4 - bromoacetylamino - 5 - bromopyridazone-(6).

References Cited
UNITED STATES PATENTS
3,210,353   10/1965   Reicheneder et al. ____ 260—250

DONALD G. DAUS, Primary Examiner

R. D. McCLOUD, Assistant Examiner

U.S. Cl. X.R.

71—92